United States Patent [19]

Yang

[11] Patent Number: 5,040,841
[45] Date of Patent: Aug. 20, 1991

[54] MAGNETIC SUN VISOR ATTACHMENT APPARATUS

[76] Inventor: Pai-Sung Yang, 2716 7th Street, Santa Monica, Calif. 90405

[21] Appl. No.: 636,283

[22] Filed: Dec. 31, 1990

Related U.S. Application Data

[63] Continuation-in-part of Ser. No. 584,252, Sep. 18, 1990, which is a continuation-in-part of Ser. No. 466,862, Jan. 18, 1990, abandoned, which is a continuation-in-part of Ser. No. 423,059, Oct. 18, 1989, abandoned.

[51] Int. Cl.$^5$ ................................................ B60J 3/02
[52] U.S. Cl. ...................................... 296/97.6; 296/97.7
[58] Field of Search ..................... 296/97.6, 97.7, 97.8, 296/97.9

[56] References Cited

U.S. PATENT DOCUMENTS

| | | | |
|---|---|---|---|
| 2,603,530 | 7/1952 | Jones | 296/97.6 |
| 4,353,593 | 10/1982 | Henson | 296/97.6 |
| 4,635,995 | 1/1987 | Mineck | 296/97.6 |

FOREIGN PATENT DOCUMENTS 2111447  7/1983  United Kingdom ............... 296/97.6

Primary Examiner—Margaret A. Focarino
Assistant Examiner—Andrew C. Pike
Attorney, Agent, or Firm—Allan M. Shapiro

[57] ABSTRACT

A magnetic sun visor attachment apparatus for a motor vehicle comprises three different magnetic attachment devices and at least one magnetically attractable bent metal shield for magnetic attachment onto the devices. The three attachment devices are, first, at least one U-shaped magnet-bearing clamp which is movably and removably clamped onto the conventional main sun visor, second, at least one magnet-bearing flat support which is affixed, as by pressure-sensitive adhesive tape, onto the side window frame or similar upper interior surface of a vehicle and, third, at least one magnet-bearing V-shaped bent plate which is affixed, as by a hook and pile fastener, onto the dashboard. The bent metal shield serves as a sun visor, i.e., to block the sun's rays whether the sun's rays are seen directly or by reflection, and is movable with respect to the magnets so as to provide wide ranges of blocking areas. The bent metal shield is bent along a line near one edge so that a major shield surface is provided at an angle to the bend, permitting the operator to choose two different shield angles for maximizing the sun shielding effect. The dashboard mounted plate is bent to a suitable angle such that the shield mounted thereon just blocks the reflection of sunlight from the front part of the vehicle.

8 Claims, 1 Drawing Sheet

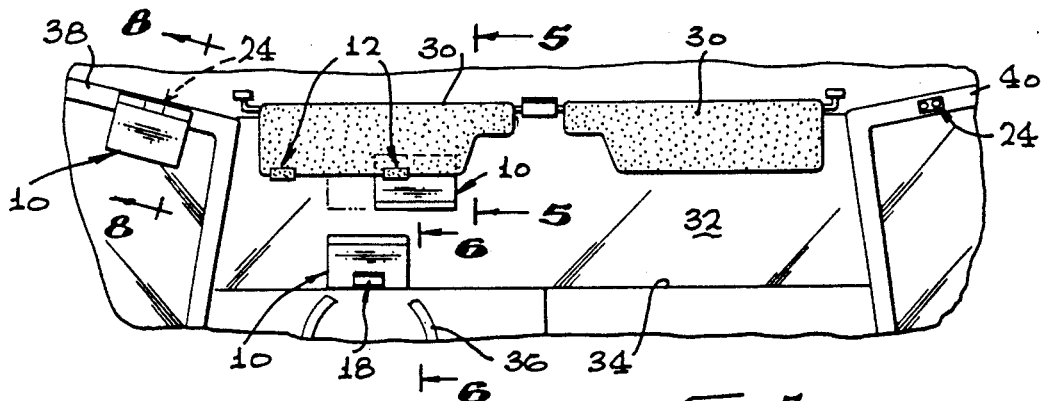
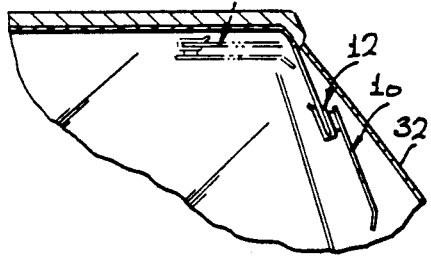
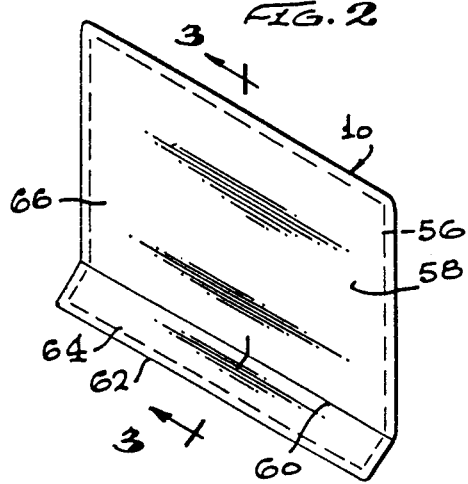
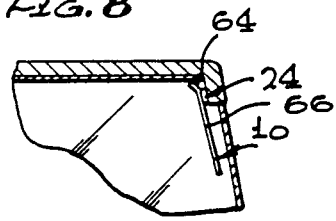
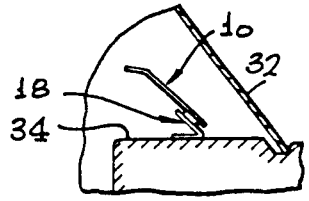
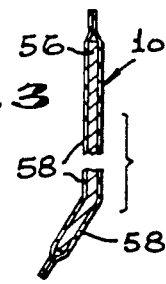
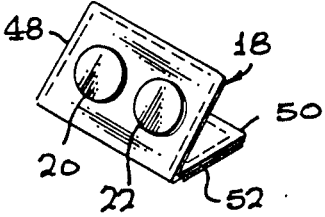
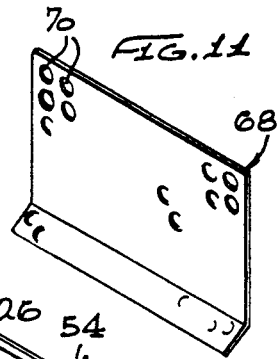
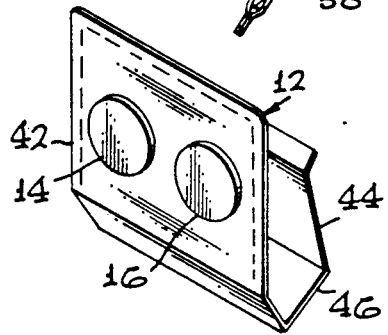
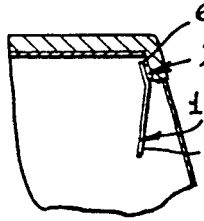
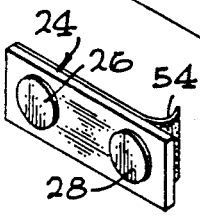

MAGNETIC SUN VISOR ATTACHMENT APPARATUS

CROSS REFERENCES TO RELATED APPLICATIONS

This application is a continuation-in-part of U.S. Pat. application Ser. No. 07/584,252 filed Sep. 18, 1990, which is a continuation-in-part of U.S. Pat. application Ser. No. 07/466,862 filed Jan. 18, 1990, now abandoned, which is a continuation-in-part of U.S. Pat. application Ser. No. 07/423,059, filed Oct. 18, 1989, now abandoned, all by the same inventor.

BACKGROUND OF THE INVENTION

1. Field of the Invention

This invention relates to the magnetic attachment of a sun visor to a portion of a vehicle's interior. More particularly, this invention relates to the magnetic attachment of an adjustable sun visor in various positions and places within a vehicle's interior.

2. Description of the Prior Art

Sun visors are legion throughout the United States. Awnings and eaves on buildings, headbands and caps with bills, as well as the usual sun visor included in presently manufactured automobiles are various types of sun visors. As such, sun visors are generally well known in the art.

Despite their almost trivial nature, sun visors play an important role in the safety and comfort of those exposed to direct or reflected sunlight. Vision can be greatly enhanced by the use of a sun visor as the intense light of the sun can distort images presented to the human eye and prevent visual perception of objects that would otherwise be easily seen. Due to their useful nature, as well as the ease and low expense of manufacture, several sun visors are present in the prior art.

U.S. Pat. No. 4,635,995 discloses an attachable sun visor that uses a U-shaped clamping device. This patent discloses an attachable sun visor that blocks incoming sunlight from the windshield, but must be attached to a generally smooth main sun visor. Also, the patented sun visor therein is only attachable to places where it can be clamped, thus limiting its use.

U.S. Pat. No. 4,058,340 discloses a retainer for a sun visor extension. The retainer used is difficult to attach to a main sun visor that is not smooth. Also, the retainer is only useful for attachment of a supplemental sun visor to a main sun visor. Blocking sunlight at other places is not within the contemplation of that invention.

U.S. Pat. No. 4,623,188 discloses a height adjustable sun visor that is limited to vertical motion. Further, direct attachment to the vehicle prohibits maneuverability and adjustment of the disclosed sun visor.

U.S. Pat. No. 3,649,068 discloses an adjustable sleeve for a sun visor that is limited to horizontal motion and attachment to a conventional sun visor.

U.S. Pat. No. 4,666,205 discloses an auxiliary sun visor that is mounted to the upper surface of a vehicle. As this sun visor is designed to permanently block light, it is difficult to remove or dismount and cannot be moved or adjusted to block light at other places within the vehicle's interior.

U.S. Pat. No. 4,005,899 discloses an anti-glare shield for vehicles used to block reflected sunlight from the front part of the vehicle. The anti-glare shield must be supported on a generally horizontal dashboard and cannot be used for blocking sunlight or glare coming in from the upper portion of the vehicle's windows.

U.S. Pat. No. 2,603,530 discloses a magnetic sun visor that is mounted in an inconvenient and cumbersome manner.

U.S. Pat. No. 4,353,593 discloses a sun shield which is fastened in a manner which is too cumbersome and inconvenient for a driver occupied with demands of the road.

All of the aforementioned U.S. patents have some bearing on the art of blocking or deflecting light incoming to the interior of a vehicle. However, none of them directly address the crucial elements of removability and adjustability without distraction while offering a large number of places for sun visor affixation. The sun visor disclosed and claimed herein addresses these omissions while also allowing such features without great expense. Thus, whatever the precise merits, features and advantages of the above cited references, none of them achieves or fulfills the purposes of the sun visor system disclosed in this application.

SUMMARY OF THE INVENTION

In order to aid in the understanding of this invention, it can be stated in essentially summary form that it is directed to a novel sun visor and novel devices by which the sun visor may be attached to different areas of a vehicle's interior. These devices include magnets. In order to augment the sun visor's usefulness, the attachment devices are securable to the vehicle at strategic locations within easy reach of the driver so that he may adjust the attitude of the sun visor according to his needs. To maximize convenience and safety, the sun visor itself is easily manipulated and non-distracting.

Accordingly, it is an object of this invention to provide attachment means for removably attachable sun visors.

It is also an object of this invention to provide for removably attachable sun visors attachment means affixable to portions of a vehicle interior.

It is also an object of this invention to provide such means that are easy and convenient to use.

It is also an object of this invention to provide such means that are inexpensive and easy to install.

The features of the present invention which are believed to be novel are set forth with particularity in the appended claims. The present invention, both as to its organization and manner of operation, and together with further objects and advantages thereof, may be understood best by reference to the following description taken in connection with the accompanying drawings.

BRIEF DESCRIPTION OF THE DRAWINGS

FIG. 1 is a perspective view, looking forward from the interior of a vehicle, showing the sun visor attachment means of the present invention.

FIG. 2 is a perspective view of a novel removably attachable sun visor for use with the attachment means of the present invention.

FIG. 3 is a fragmentary sectional view of the sun visor, taken along line 3—3 in FIG. 2.

FIG. 4 is a perspective view of a U-shaped clamp of the present invention with magnets.

FIG. 5 is a side view of a conventional sun visor incorporating the present invention in a forward interior portion of a vehicle, taken partly in section and generally along line 5—5 in FIG. 1.

FIG. 6 is a side view of the dashboard of a forward interior portion of a vehicle, taken partly in section and generally along line 6—6 in FIG. 1.

FIG. 7 is a perspective view of a V-shaped support of the present invention with magnets.

FIG. 8 is a rearward view of an upper side portion of a vehicle interior, taken partly in section and generally along line 8—8 of FIG. 1.

FIG. 9 is a perspective view of an adhesively backed flat support of the present invention with magnets.

FIG. 10 is a rearward view with the same aspect as FIG. 8, showing the novel sun visor in another position.

FIG. 11 is a perspective view of a modified embodiment of the novel sun visor.

DETAILED DESCRIPTION OF THE PREFERRED EMBODIMENT

The reduction of glare and bright sunlight in the interior of a vehicle provides the driver with better vision and enables the driver to act with greater safety. To this end, means are made available by the present invention by which a removably attachable sun visor 10 in the form of a thin metal shield may be removably attached to various places in a vehicle interior as illustrated in FIG. 1.

Three means of attachment are disclosed: a U-shaped clamp 12 (FIG. 4) with a pair of magnets 14 and 16, a V-shaped support 18 (FIG. 7) with a pair of magnets 20 and 22, and a flat support 24 (FIG. 9) with a pair of magnets 26 and 28. As seen in FIG. 1, a pair of the clamps 12 are clamped onto a conventional sun visor 30 that is present inside a vehicle near the windshield 32. The V-shaped support 18 is affixed onto a vehicle dashboard 34, preferably in front of the steering wheel 36. The flat support 24 is affixed to an upper interior surface of a vehicle, such as a window frame 38 on the driver's side or frame 40 on the passenger's side.

The U-shaped clamp 12 (FIG. 4) is made of a sturdy resilient material such as steel that allows it to be stably affixed onto the conventional sun visor 30 by compression between the legs 42 and 44 of the clamp for a snug fit. The longer leg 42 has the two magnets 14 and 16 on its outer face. The legs 42 and 44 are integrally connected by a joint portion 46 so that the legs 42 and 44 act as leaf springs. The joint 46 is approximately as wide as the thickness of a conventional sun visor 30 so that the clamp 12 fits snugly. The clamp 12 is both compressible and expandable so that, if the conventional sun visor 30 is too thin or too wide for the initial opening between the legs 42 and 44, the spacing between the legs may be adjusted.

The magnets 14 and 16 are glued onto the outer face of the longer leg 42 and are spaced from each other to provide two points of support for the sun visor 10. The use of two points of support, instead of just one, for the sun visor 10 prevents the sun visor 10 from turning on a single axis of magnetic support. Two magnets also provide greater support for the sun visor 10 so that any jars or bumps experienced by the car will have less of a tendency to dislocate the sun visor 10. The other visor supports 18 and 24 similarly employ two magnets 20, 22 and 26, 28 respectively.

The V-shaped support 18 as shown in FIG. 7 also is constructed out of sturdy resilient material such as steel. The V-shaped support 18 has an upper side 48 and a lower side 50 of approximately equal length of about two inches each. The two magnets 20 and 22 are glued onto the outer face of upper side 48. One portion 52 of a hook and loop fastener (of the type marketed under the trademark Velcro) is glued to the undersurface of lower side 50 so that it can be readily attached to and removed from its mating portion (not shown) of the hook and loop fastener. The mating portion is glued to the dashboard 34. Of course, instead of the hook and loop fastener, the undersurface of the lower side 50 may be glued or otherwise affixed to the dashboard 34. Then, the sun visor 10 may be removably attached to the magnets 20 and 22 and adjusted by bending upper side 48 for greatest comfort and light blockage.

FIG. 9 shows the third attachment apparatus for the sun visor 10 of the present invention The flat support 24 is made of a sturdy, perhaps flexible, material and may be backed with glue, adhesive, or part of a hook and loop fastener system so that the flat support 24 may be affixed to an interior surface of a vehicle. A double-sided pressure-sensitive adhesive tape 54 is shown, partly curled back for illustration. The flat support 24 is approximately 3 inches long and 1 inch wide.

Alternatively, magnets themselves may be used alone or together with other magnets and having some backing by which it may be affixed to an interior surface of a vehicle. Such magnets should be used at least in pairs in order to better hold the sun visor 10 and to prevent any turning and dislocation thereof.

The above-described attachment devices of the present invention are used with lightweight sun visors 10 which are magnetically attractable and thus both removably attachable and readily adjustable. The sun visor 10 is a generally rectangular, lightweight shield made of magnetically attractable material, preferably steel 56, and preferably is encased in plastic 58 as seen in FIG. 3. This form of construction also is employed with the clamp 12 and support 18, as indicated by the broken lines shown in FIGS. 4 and 7.

The sun visor 10 has an angular bend, indicated at 60, near a longitudinal edge 62 so as to provide a long bent portion 64 at an angle to the main flat portion 66. This angular bend 60 facilitates adjustment of the sun visor 10 when used in the present invention by allowing a different angle of attachment of the sun visor 10 to the attachment means. As in FIG. 8, if the sun visor 10 is attached at its flat portion 66 to one of the attachment means, the sun visor 10 runs predominantly flat along a course parallel to the plane of the means of attachment. As in FIG. 10, if the sun visor 10 is attached at its bent portion 64 to one of the attachment means, the sun visor 10 runs predominantly at an angle to the plane of the means of attachment. This angular difference gives a greater measure of control over the sun blocking ability of the sun visor 10 when used in conjunction with the described attachment means and increases the usefulness thereof.

FIG. 1 shows the forward-looking view of an interior portion of a vehicle incorporating the described devices of the present invention.

Conventional main sun visors, such as at 30, are shown in a "down" and sun-blocking position near the top of FIG. 1. The left main sun visor 30 is on the driver's side of the vehicle. Two U-shaped clamps 12 are shown attached to the main sun visor 30, their magnets 14 and 16 facing the windshield while the main sun visor 30 is in the "down" position. While the sun visor 10 is attached to the main sun visor 30 by the clamps 12, the sun blocking ability of the main sun visor 30 is effectively increased. The sun visor 10 augments the sun blocking ability of the conventional sun visor 30 in a specifically useful way that is tailored to the needs of the driver who adjusts the sun visor 10 to suit his own present needs. Further, the conventional sun visor's ability to pivot from the "up" (non-sun-blocking position) to the "down" (sun-blocking position) gives the sun visor 10 a greater radial distance through which it can move as an extension of the conventional sun visor 30. This is true even though the angular displacement is the same for the sun visor 10 as for the conventional sun visor 30. Further, as the sun visor 10 can be removably attached in different places to the U-shaped clamp 12, the U-shaped clamp 12 also can be moved to attach to the conventional sun visor 30 in different places. This provides even greater sun-blocking potential and convenience in the use of the sun visor 10 and U-shaped clamp 12 of the present invention.

FIGS. 1 and 6 show the use of the V-shaped support 18 of the present invention. Especially on flat, horizontal surfaces such as the dashboard 34, the V-shaped support 18 gives the sun visor 10 means of support where none would otherwise be present. For light reflected off of the hood of a car, a driver needs some means by which such light can be blocked or deflected. The V-shaped support 18 provides support for the sun visor 10 in a plane that runs approximately parallel to the plane of the windshield 32. By sliding adjustment along the magnets 20 and 22, a driver can position the sun visor 10 so that light glaringly reflected off the hood of the vehicle into the driver's eyes is deflected while the driver's vision of the road remains unobstructed.

In order to minimize the reflection of the sun visor 10 in the windshield 32, one side of the sun visor 10 should be a dark color, such as black, and the sun visor 10 should be attached to the V-shaped support 18 with the dark color side facing the windshield 32 and not the driver or interior vehicle space.

As seen in FIGS. 1, 8 and 10, the flat support 24 may be affixed to an upper surface of a vehicle interior to provide stable magnetic attachment for the sun visor 10. Adjustment of the sun visor 10 is performed by sliding or removably attaching the sun visor 10 at different areas to the magnets 26 and 28 of the flat magnet support 24 as shown in FIGS. 8 and 10.

FIG. 11 shows a magnetically attractable sun visor 68 that is identical to the sun visor 10 except that it has been perforated throughout by small holes or apertures 70. The holes 70 provide means for some visibility through the sun visor 68, yet the sun visor 68 still blocks most of the light. In this way, light incident upon the sun visor 68 is diminished to that which passes through the holes 70 yet is not fully blocked. The perforated sun visor 68 may be encased in some material other than plastic so long as encasing the perforated sun visor 68 does not seal up the holes. Either of the embodiments of FIG. 3 or FIG. 11 may be used in the present invention in order to block or inhibit light incoming to a vehicle interior.

The invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. For use in a motor vehicle, a sun visor system comprising:
   a U-shaped clamp affixable to a main sun visor of the vehicle, a first magnet means secured to said U-shaped clamp;
   a flat support affixable to an upper interior surface of the vehicle, a second magnet means secured to said flat support;
   a V-shaped support affixable to a dashboard of the vehicle, a third magnet means secured to said V-shaped support; and
   a removably attachable sun visor comprising a magnetically attractable thin metal shield for removable magnetic attachment to any one of said first, second, and third magnet means of said U-shaped clamp, said flat support, and said V-shaped support, respectively.

2. The sun visor system of claim 1 wherein each of said magnet means comprises a pair of spaced magnets.

3. The sun visor system of claim 1 wherein said V-shaped support defines a V-shaped angle which approximates an angle between a windshield and the dashboard of the vehicle and is manually bendable for selective change of said V-shaped angle.

4. The sun visor system of claim 1 wherein said metal shield of said attachable sun visor has an angular bend whereby said metal shield has a main flat portion and a long bent portion, said attachable sun visor being magnetically attachable to said magnet means at a selictive one of said main flat portion and said long bent portion for selection of an angle of the attachable sun visor.

5. The sun visor system of claim 4 wherein said attachable sun visor has a plurality of holes for permitting partially unobstructed vision through said attachable sun visor.

6. The sun visor system of claim 5 wherein said V-shaped support defines a V-shaped angle which approximates an angle between a windshield and the dashboard of the vehicle and is manually bendable for selective change of said V-shaped angle.

7. The sun visor system of claim 4 wherein each of said magnet means comprises a pair of spaced magnets.

8. The sun visor system of claim 4 wherein said V-shaped support defines a V-shaped angle which approximates an angle between a windshield and the dashboard of the vehicle and is manually bendable for selective change of said V-shaped angle.

* * * * *